(12) United States Patent
Vincent et al.

(10) Patent No.: US 7,160,359 B2
(45) Date of Patent: Jan. 9, 2007

(54) BUILT IN PURIFIER FOR REACTIVE GASES

(75) Inventors: Jean Louise Vincent, Bethlehem, PA (US); Ronald Martin Pearlstein, Macungie, PA (US); Kerry Renard Berger, Lehighton, PA (US); Anthony John Lachawiec, Jr., Ann Arbor, MI (US)

(73) Assignee: Air Products and Chemicals, Inc., Allentown, PA (US)

( * ) Notice: Subject to any disclaimer, the term of this patent is extended or adjusted under 35 U.S.C. 154(b) by 136 days.

(21) Appl. No.: 10/884,824

(22) Filed: Jul. 2, 2004

(65) Prior Publication Data

US 2006/0000850 A1   Jan. 5, 2006

(51) Int. Cl.
B01D 35/02 (2006.01)
F17C 13/00 (2006.01)

(52) U.S. Cl. .............................. 95/90; 96/134; 55/420; 222/189.06; 222/3

(58) Field of Classification Search .................. 96/134, 96/135; 95/90; 55/385.4, 418, 420; 220/560.04; 222/3, 189.06
See application file for complete search history.

(56) References Cited

U.S. PATENT DOCUMENTS

| 1,821,549 | A | | 9/1931 | Hornor et al. |
| 5,409,526 | A | | 4/1995 | Zheng et al. |
| 5,917,066 | A | * | 6/1999 | Eisenmann et al. ........... 55/502 |
| 5,980,599 | A | | 11/1999 | Chris et al. |
| 6,314,986 | B1 | | 11/2001 | Zheng et al. |
| 6,346,138 | B1 | | 2/2002 | Holmer |
| 6,360,546 | B1 | | 3/2002 | Wang et al. |
| 6,527,009 | B1 | | 3/2003 | Zheng et al. |
| 6,557,591 | B1 | | 5/2003 | Pearlstein et al. |
| 6,572,688 | B1 | | 6/2003 | Irven et al. |
| 6,648,021 | B1 | | 11/2003 | Zheng et al. |
| 2003/0017089 | A1 | | 1/2003 | Hertzler |
| 2003/0102051 | A1 | * | 6/2003 | Hasaka et al. .............. 141/325 |
| 2003/0192430 | A1 | * | 10/2003 | Pearlstein et al. ............. 95/90 |
| 2004/0123735 | A1 | * | 7/2004 | Watanabe et al. ............. 95/90 |

FOREIGN PATENT DOCUMENTS

EP   1 316 755 A1   6/2003

OTHER PUBLICATIONS

Robin Binder, et al, Compatibility of CO With Various Metals and Metal Alloys . . . Applications Notes, Mykrolis.

* cited by examiner

Primary Examiner—Frank M. Lawrence
(74) Attorney, Agent, or Firm—Lina Yang; Geoffrey L. Chase (57) ABSTRACT

The present invention is an apparatus for containing and dispensing a high purity fluid comprising an outer vessel capable of containing a quantity of high purity fluid in its interior; an outlet associated with the outer vessel for dispensing the high purity fluid; a valve capable of controlling high purity fluid flow out of the outer vessel through the outlet; an inner vessel at least partly situated in the outer vessel and communicating with the outlet and an inlet which communicates with the interior of the outer vessel; a purification media contained within the inner vessel for purifying the high purity fluid of undesired components; and fluid flow control device which prevents high purity fluid from flowing from the inner vessel to the interior of the outer vessel.

17 Claims, 4 Drawing Sheets

BUILT IN PURIFIER FOR REACTIVE GASES

BACKGROUND OF THE INVENTION

There are many applications for high purity fluids (gases and liquids) delivered from vessels (e.g., tanks and cylinders). Such high-purity fluids are often used in processing of electronic, optical, pharmaceutical and chemical products.

In some cases, it is advantageous to purify these fluids at the time they are withdrawn from said vessels, particularly since storage in the vessel can often impart impurities to the fluid over time. Purification can be accomplished by passing the fluid through a purification media such as adsorbents, getters or filters.

A useful means of accomplishing this purification is to situate an inner vessel containing the purification medium within the interior of the vessel that contains the fluid; the inlet of the inner vessel would be in fluid communication with the interior volume of the outer vessel.

Some purification media, however, can have the paradoxical ability to add contaminants to the fluid that they are intended to purify. One specific example is the case where the purification medium acts as a decomposition catalyst for the fluid being purified.

In many cases, the rate at which this decomposition occurs rises monotonically with the pressure of the fluid, particularly if the fluid is compressible (i.e. when it is a gas).

In a different example, some media are known to slowly leach or desorb contaminants into the fluid.

These problems are overcome by the present invention wherein contamination of the small amount of fluid in direct contact with the purification media within the inner vessel may be tolerable, as long as this contamination is minimized and not allowed to diffuse or otherwise mix with the bulk of the fluid stored in the outer vessel. For instance, using the present invention, it may be possible to briefly vent the small amount of contaminated fluid in the inner vessel before using the contents in the application that requires high purity. These and other advantages of the present invention will be set forth in greater detail below.

BRIEF SUMMARY OF THE INVENTION

The present invention is an apparatus for containing and dispensing a high purity fluid comprising an outer vessel capable of containing a quantity of high purity fluid in its interior; an outlet associated with the outer vessel for dispensing the high purity fluid; a valve capable of controlling high purity fluid flow out of the outer vessel through the outlet; an inner vessel at least partly situated in the outer vessel and communicating with the outlet and an inlet which communicates with the interior of the outer vessel; a purification media contained within the inner vessel for purifying the high purity fluid of undesired components; and fluid flow control device which prevents high purity fluid from flowing from the inner vessel to the interior of the outer vessel.

DETAILED DESCRIPTION OF THE INVENTION

High purity NO, $AsH_3$, $PH_3$, and $GeH_4$ gases are currently sold for electronics applications. A built in purifier in an industrial gas cylinder outlet offering for these gases to remove critical impurities such as metals, $H_2O$, acids, CO, and $CO_2$ would be advantageous. However, these gases slowly decompose (ppm level) in the presence of almost any adsorbent, contaminating the entire cylinder contents. The current invention is an equipment modification to the built in purifier design. A check valve has been added at the inlet of the built in purifier tube (inside the cylinder) so that decomposition products formed in the built in purifier tube cannot back-contaminate the cylinder content. The decomposition products of the gas are flushed out in the first increment of flow.

More particularly, the present invention is a point-of-delivery purification system in which an inner vessel containing purification media is in fluid communication with the interior of an outer vessel that contains a fluid that will pass through the inner vessel, containing some form of purification media, before passing out of both the inner vessel and the outer vessel to be dispensed to a point of use; the improvement being that the inlet of the inner vessel in communication with the interior of the outer vessel is fitted with a device or fluid flow control device to prevent back-flow from the inner vessel back into the interior of the outer vessel. Optionally the fluid flow control device also serves to reduce the pressure of the fluid within the inner vessel relative to that in the interior of the outer vessel.

The present invention provides a means of avoiding back contamination from an integral inner vessel purifier, by installing a fluid flow control device, such as a check valve or similar device, upstream of the inner vessel to prevent back-flow of contaminated fluids from mixing with the bulk of the fluid stored in the interior of the outer vessel. A second feature of this invention is to reduce the pressure of the fluid in the inner vessel relative to that of the fluid in the interior of the outer vessel. This pressure reduction, particularly when the fluid is compressible, as in the case of a gas, will reduce the density of the fluid in contact with the purification medium and thereby reduce the inventory of fluid that can potentially be contaminated and may, in certain instances, reduce the rate of decomposition or leaching that causes the contamination.

Figure 1:
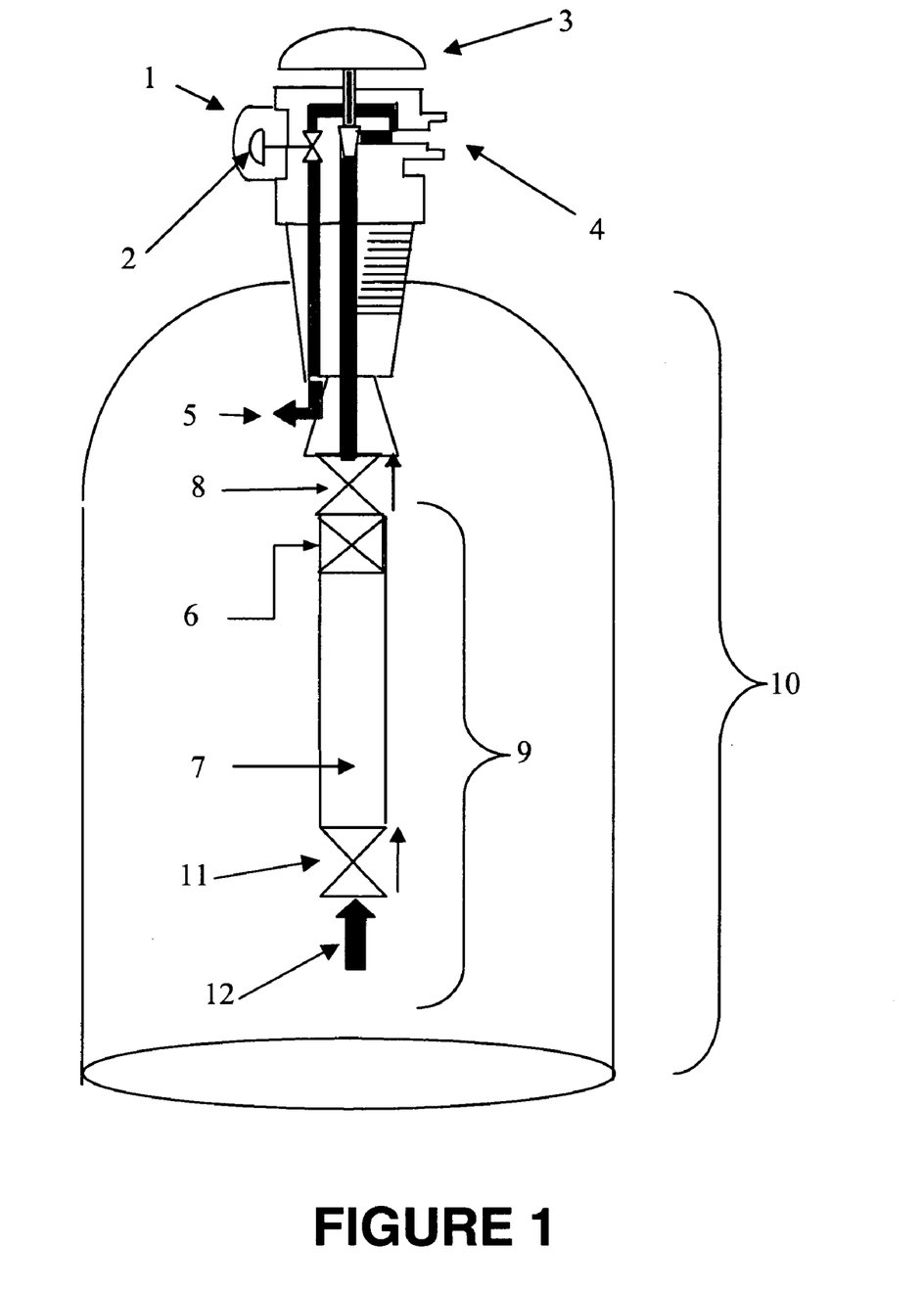
FIG. 1 is a schematic cross-section of an embodiment of the present invention.

The preferred embodiment of the invention is shown in FIG. 1. In this device, the outer vessel 10 may be any vessel suitable for containing the fluid to be dispensed. For liquids, this vessel may be any closed container; such as: a jug, drum, carboy, cylinder, bottle and the like. If the fluid being dispensed is a compressed gas, then the vessel should be an approved vessel for the storage and transport of gases, typically in the form of an industrial gas cylinder, although spherical and other forms are possible. The outer vessel 10 size can range from about 200 mL up to about 600 L, though larger vessels might be contemplated. The outer vessel 10 can be made from any material compatible with the fluid being contained within it. For electronic materials service, the interior may be electropolished and constructed of carbon steel, stainless steel, aluminum, nickel, Monel or any of the above with added protective inner linings.

The inner vessel 9 must also have an outlet 4 through which the purified fluid is dispensed. This outlet connection is preferably sealed by using a valve assembly 3. As shown in FIG. 1, such a valve assembly 3 is connected to the outlet 4 of the inner vessel 9. The inner vessel 9 may be connected to the valve assembly 3 by any means known in the art such as by welding, brazing, soldering or by using threaded connections, gasketed connections or any of the compression fitting connections, that are well-known in the art. Preferably this valve assembly 3 further serves the function of sealing the outer vessel 10. This valve assembly 3 also preferably serves to provide a second filling path 5 that by-passes the flow path of outlet 4 for dispensing purified fluid by operation of valve 2, which preferably is protected from tampering by cover 1.

The inner vessel 9 preferably has at least one porous element 6 situated adjacent to the valve assembly 3 to prevent the release of any of the other purification media 7 or particles dislodged from them to be carried with the purified fluid. Most preferably, this porous element takes the form of a sintered metal cup (filter cup) welded or otherwise firmly affixed to the outlet of the inner vessel or a mesh screen, glass wool, membrane or similar filtering device well known in the art.

The inner vessel 9 contains a purification media 7 in the form of particles, porous composites or packing which function to sorb, adsorb, absorb, getter, bind or filter undesired agents or impurities from the fluid contained in the interior of the outer vessel 10. The inner vessel 9 is at least partially contained within the outer vessel, 10. Preferably, the inner vessel 9 is fully contained in the interior of the outer vessel 10 and share a common outlet 4. This inner vessel 9 contains one or more of the following purification media: adsorbents (e.g. zeolites, carbons, aluminas, aluminosililcates, silica gels, magnesias, fluorisil, cross-linked microporous polymers, magnesium sulfate), getters (e.g. supported metals such as lithium on carbon, barium on carbon, copper on alumina, water getters, i.e., dessicants, such as magnesium chloride on carbon, magnesium chloride on alumina, magnesium bromide on carbon), catalysts (e.g. nickel on alumina, palladium on carbon) or filters (e.g. porous polypropylene, porous poly(tetrafluorethylene), stainless steel mesh, sintered nickel, sintered stainless steel, porous alumina). This media may be capable of inadvertently or undesirably interacting, reacting with or catalyzing the decomposition of the high purity fluid to cause some form of contaminant or impurity in the high purity fluid in the purification media, particularly at high pressures or during long residence times, such as when the valve assembly is closed in a non-dispense mode for the outer vessel.

The inner vessel 9 has at least one inlet 12 that is contained within the interior of the outer vessel 10. A fluid flow control device 11, in this instance a check valve, is situated between the fluid contents of the interior of the outer vessel 10 at this inlet 12 to the inner vessel 9 that prevents or effectively reduces the flow of fluid from the inner vessel 9 back into the interior of the outer vessel 10, and provides substantially less resistance to flow of the fluid in the direction of the outlet 4 for dispensing fluid from the interior of the outer vessel 10 and the inner vessel 9. There are many such fluid flow control devices 11 well-known in the art for accomplishing such flow rectification; these devices are often commonly known as check valves.

Figure 2A:
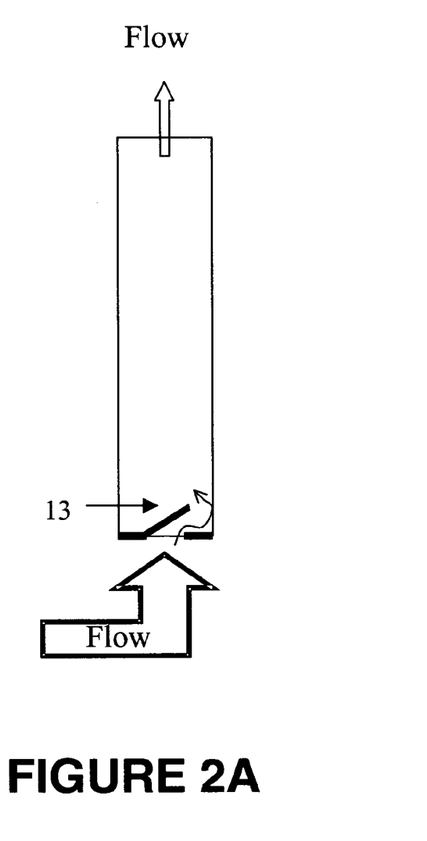
FIGS. 2A and 2B are schematic cross-sections of the fluid flow control of the present invention.
Figure 2B:
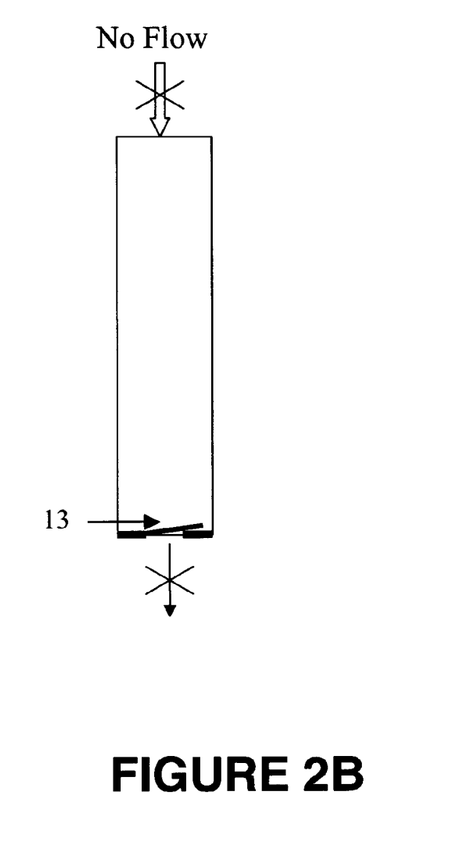

One of the simplest types of check valves is the flapper type device 13 as depicted schematically in FIGS. 2A and B, where the flow in the direction of outlet 4 (from the interior of the outer vessel 10 through the inner vessel 9 to outlet 4) displaces a flexible flap away from the fluid passageway allowing flow to occur, but reverse flow is blocked when the flap obscures and blocks the passageway from fluid flow because caused by the pressure of the reverse flow itself, or by an external force (e.g. gravity or elasticity).

Figure 3:
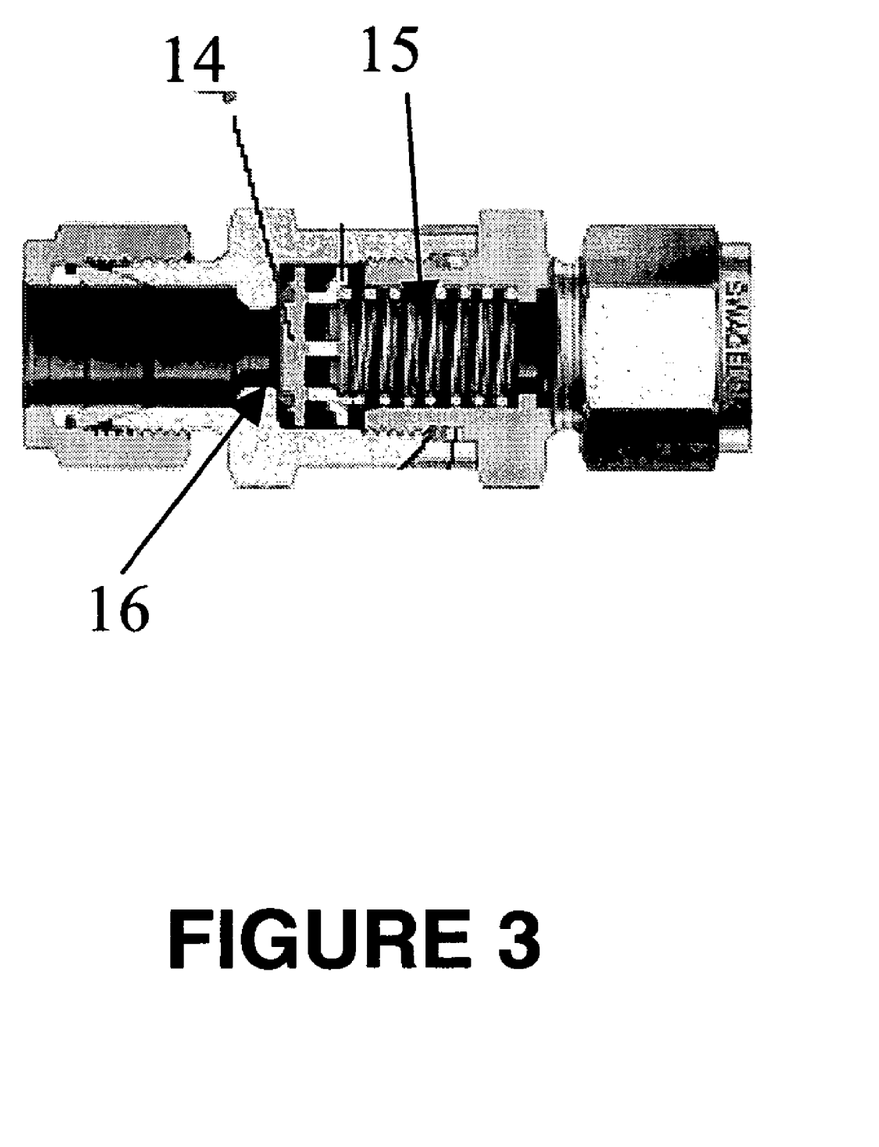
FIG. 3 is a cross-sectional view of a particular embodiment of a fluid flow control of the present invention.

Other apparatus functioning as a fluid flow control device include a spring-loaded poppet device. FIG. 3 shows a poppet-type check valve, where a spring 15 seats a poppet 14 against a seat 16 preventing flow until sufficient pressure difference is present to generate sufficient force on the poppet to overcome the spring force and allow it to be displaced away from the seat and permit flow. Such a device not only biases flow in one direction, but can provide that the pressure of the fluid downstream of such a poppet check valve is always a certain amount lower than the upstream pressure.

The force applied on the spring of a poppet type check valve can be adjusted to open only when a pre-determined pressure difference exists between the outer vessel and the inner vessel. This opening or 'cracking' pressure can preferably be set between about 0.33 psig to about 1450 psig (0.023–100 bar) with the most preferred range between 1.45 psig and 145 psig (0.1–10 bar). Although there is usually some hysteresis (i.e. the opening pressure difference is usually greater than the pressure difference under which the poppet reseals itself) such a device will ensure that the pressure in the inner vessel is always lower than the pressure of the outer vessel by a nearly fixed amount. There are several potential benefits to this arrangement:

Lower fluid inventory in contact with the purifying media 7;

Reduced decomposition rate on the purifying media 7;

Lower non-selective adsorption on the purifying media 7;

Provides that the "heel" is not passed through the purifier 9;

Easier installation of the activated purifier 9 into the outer vessel 10; and

Reduced likelihood of liquefaction of fluid in the inner vessel 9.

The last point is significant. In the case where the fluid is a liquid stored under its own vapor pressure, the inner vessel 9 would be expected to be filled with liquid at least when it is surrounded by liquid in the outer vessel 10. By choosing the pressure reduction appropriately, it is possible to ensure that the fluid can only exist in the gas phase within the inner vessel 9. Many purification media such as adsorbents, filters and getters operate much more effectively with gas-phase fluids because of reduced mass transport limitations correlated to the lower viscosity in that phase. Furthermore, some liquids are capable of degrading certain media by dissolution or erosion, which does not occur when the same material is contacted with these media as a vapor.

Optionally, a fluid flow control device, such as a check valve, 8 could be placed immediately between the inner vessel 9 and the valve assembly 3 to prevent back contamination of the purification media 7 during use. If a check valve 8 with sufficient cracking pressure were used, then a check valve is effectively present on both ends of the inner vessel 9, thus the media 7 would be protected from fluid ingress during handling and assembly.

Referring to FIG. 1, in normal operation the fluid is contained within the interior of the outer vessel 10. Examples of fluids that can be stored in the outer vessel 10 include; carbon monoxide, nitric oxide, silane, arsine, diborane, phosphine, dichlorosilane, trichlorosilane and many others. These fluids are charged into the outer vessel 10 by using the separate fill path 5. For initial shipping and storage, it is possible to keep the inner vessel 9 pressurized with a different, preferably inert, fluid that can be easily removed or which does not consitute a deleterious impurity. Examples of such fluids include helium, argon, tetrafluoromethane and nitrogen, though many other could be envisioned. Because of the check valve 11 between the inner vessel 9 and the interior of the outer vessel 10, there will be no back flow of this inert fluid to potentially contaminate the fluid contained in the outer vessel 10. Further, by ensuring that the pressure of the inert fluid contained within the inner vessel 9 is not less than the pressure of the fluid in the outer vessel 10 by more than the cracking pressure of the check valve 11, little or none of the fluid from the outer vessel 10 should flow into the inner vessel 9 until the customer valve 3 is opened.

When the customer valve 3 is opened, then the pressure of the inert fluid is released and can be vented to a waste system if necessary. Once the pressure in the inner vessel 9 drops due to flow commenced through the outlet connection 4 (e.g. CGA or DISS connection), then the check valve 11 situated between the outer 10 and inner vessel 9 will open and allow the fluid to pass through the purification media 7.

Once this initial flow is conducted, then some of the desired process fluid will always be exposed to the purification media 7. As long as flow continues, the media 7 of the inner vessel 9 will purify the fluid and deliver it to the user through the valve assembly 3. When the flow of the fluid is stopped, either by shutting the customer valve 3 or by blocking flow somewhere downstream of the outlet connection 4, the fluid may begin to pick up contaminants from the exposure to the purification media 7. As these contaminants build up over time, it might be desireable to vent a small amount of fluid to a waste handling system before re-starting flow to the end-use process after the system has not been flowing for an extended period of time. The amount of fluid required to be wasted in this process, however, only needs to be slightly greater than the inventory contained in the inner vessel 9. If the pressure, and hence the density of the fluid in the inner vessel 9 is reduced by use of the check valve 8, then the amount of fluid wasted can be significantly reduced.

Since there is no flow or diffusion of the fluid between the inner vessel 9 back into the interior of the outer vessel 10, the contaminants generated by prolonged exposure of the process fluid to the purification media 7 will not become mixed with the bulk of the fluid contained in the interior of the outer vessel 10. This fact makes it possible to get high purity fluid delivered from such a system, since the impurities generated by exposure to the purification media 7 are typically not effectively removed by the same media 7. By confining all such decompositon or leaching type contamination to the limited inventory of fluid within the inner vessel 9, it is possible to purge this contamination out of the inner vessel 9 by flowing fresh fluid from the interior of the outer vessel 10. This apparatus will conveniently allow for the delivery of a purified fluid that is not substantially degraded by exposure to the reactive purification media 7 contained within the inner vessel 9.

A further advantage of the present invention is that the internal check valve 11 prevents the operator from depleting the gas or liquefied gas in the outer vessel 10 below a certain pressure, determined by the cracking pressure of the check valve 11. The amount of gas or fluid remaining in the outer vessel 10 at this pressure is referred to as the "heel". In certain cases, it is advantageous to leave the heel in the outer vessel 10 and remove it through the bypass valve 2 before the next fluid charge. This is especially true for liquefied gases, such as; HCl or $SO_2$, where the amount of impurities increases exponentially at pressures below the vapor pressure of the desired gas due to desorption of lower vapor pressure contaminates (water) from the interior walls of the outer vessel 10. Although the media 7 in the inner vessel 9 may be able to remove these impurities, exposure to extremely high levels will limit the lifetime of the purifier media 7 in the inner vessel 9. This is an advantage, since the outer vessel 10 will ideally be re-charged with gas or fluid 2–100 times before regeneration or replacement of the purifying media 7 in the inner vessel 9 is required.

As described above, the media 7 in the inner vessel 9 could be a zeolite, silicate, carbon, or other material which may require activation prior to use for purification. The activation may involve purging with an inert gas (N2, Ar, He, etc) at ambient or preferably at elevated temperature, or placing under reduced pressure, preferably at an elevated temperature. One advantage of the present inventive design is that the check valve 8 on the inner vessel 9 allows the isolation of the purification media 7 between the check valve 8 and the customer valve 3. This protects the activated purification media 7 from exposure to air or other potentially de-activating environments after activation and prior to assembly with the outer vessel 10. It also protects the environment from exposure to potentially harmful gases due to desorption during equipment decommissioning or disassembly.

EXAMPLE 1

A 316L stainless steel tube with approximate dimensions 1.9×50 cm (0.75"×20") with fittings on each end and further equipped on one end with a porous stainless steel filter cup that was connected to a two-ported valve assembly of the type shown in FIG. 1. The tube was filled with approximately 70 g of 3A molecular sieve adsorbent through the open bottom. A stainless steel sintered disc insert was placed in the bottom of the tube to prevent the adsorbent from escaping. The bottom of the tube was then connected to a 15 psig nominal cracking pressure check valve available from Swagelock (model SS-CHS4-15-KZ-SC11) with the flow direction arrow pointing towards the adsorbent-filled tube. The tube was placed in an oven and the inlet of the check valve was attached to a dry nitrogen gas source. The dry nitrogen was flowed through the checkvalve, into the column of molecular sieve, and out the customer valve while the tube was heated at 200° C. for 16 hours. The nitrogen flow was then turned off and the customer valve closed. The tube plus valve assembly was then disconnected from the nitrogen source and threaded into a 44 L steel compressed gas cylinder to serve as the outer vessel as shown in FIG. 1. A vacuum was placed on the DISS valve outlet and the customer and by-pass valves were opened. Once the cylinder and adsorbent media were sufficiently evacuated, the customer valve was closed and the outer cylinder was filled to a pressure of 35.5 bar (515 psig) with helium through the bypass valve.

PERFORMANCE TEST ON CYLINDER FROM EXAMPLE 1

The cylinder prepared from Example 1 was connected to a two-stage regulator with digital pressure transducers, followed by an MKS mass flow controller (range 1–18 slpm). The helium was flowed through the customer valve at various flow rates between 1 and 18 slpm. Periodically, the flow was stopped and pressure readings were taken through the customer and bypass valve by the procedure described below:

Step 1: Open customer valve;
Step 2: Set mass flow controller to desired flow rate;
Step 3: Open regulator valve;
Step 4: Flow He for 1–10 minutes;
Step 5: Close regulator valve to zero flow;
Step 6: Record pressure;
Step 7: Open bypass valve;
Step 8: Record pressure;
Step 9: Close bypass valve;
Step 10: Repeat from step 2.

Figure 4:
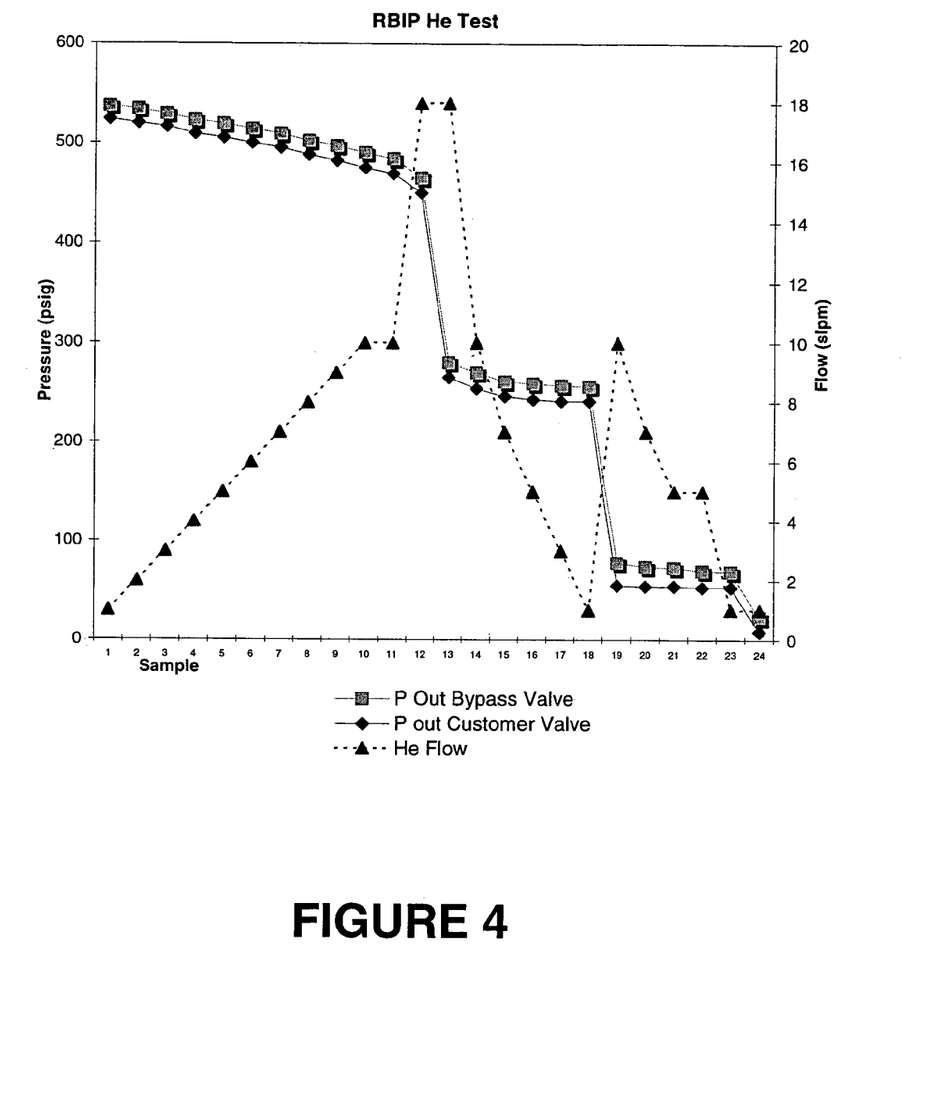
FIG. 4 is a graph of pressure measured downstream of the fluid flow control of the present invention and pressure measured through a separate port as a function of Helium dispensed from an industrial gas cylinder outfitted with the apparatus of the present invention.

As shown in FIG. 4, for the 24 samples taken, the average pressure differential between the bypass valve and the customer valve was 1.07 bar-g±0.16 bar-g (15.5 psig±2.3 psig). Furthermore, the pressure differential did not change measurably over a 24 hour period. This test verified that the assembly performed as expected under typical operating conditions, with no significant fluid (or pressure) seapage from the inner to the outer vessel The present invention has been set forth with regard to a particular embodiment, but the full scope of the present invention should be ascertained from the claims as follow.

The invention claimed is:

1. An apparatus for containing and dispensing a high purity fluid comprising an outer vessel capable of containing a quantity of high purity fluid in its interior; an outlet associated with the outer vessel for dispensing the high purity fluid; a valve assembly capable of controlling high purity fluid flow out of the outer vessel through the outlet; a separate fill path in the valve assembly with a second valve for controlling fluid flow through the separate fill path wherein an inlet for the separate fill path is the same as the outlet associated with the outer vessel; an inner vessel at least partly situated in the outer vessel and communicating with the outlet and having an inlet which communicates with the interior of the outer vessel; purification media contained within the inner vessel for purifying the high purity fluid of undesired components; and a fluid flow control device which prevents high purity fluid from flowing from the inner vessel to the interior of the outer vessel; wherein the purification media is selected from the group consisting of fluorisil, cross-linked microporous polymers, magnesium sulfate, barium on carbon, magnesium chloride on carbon, magnesium chloride on alumina, magnesium bromide on carbon, palladium on carbon, stainless steel mesh, sintered nickel, sintered stainless steel, and mixtures thereof.

2. The apparatus of claim 1 having a second fluid flow control device between the inner vessel and the outlet.

3. The apparatus of claim 1 wherein the fluid flow control device is a check valve.

4. The apparatus of claim 1 having a sintered metal cup,in the inner vessel near the outlet.

5. The apparatus of claim 1 wherein the inner vessel is connected to the valve assembly and the fluid flow control device is a spring biased poppet check valve.

6. The apparatus of claim 1 wherein the outer vessel contains a high purity fluid capable of interacting with the purification media to create contaminants.

7. The apparatus of claim 1 wherein the outer vessel contains a fill of a high purity fluid selected from the group consisting of: carbon monoxide, nitric oxide, silane, arsine, diborane, phosphine, dichlorosilane, trichlorosilane and mixtures thereof.

8. A method of dispensing an elevated-pressure high purity fluid from an outer vessel having an outlet controlled by a valve, comprising:

providing the outer vessel and an elevated-pressure fluid contained therein, an inner vessel containing purification media, having an outlet connected to the outlet of the outer vessel, and having an inlet with a fluid flow control device adapted to allow fluid to flow from the interior of the outer vessel to the inner vessel and to prevent the flow of fluid from the inner vessel to the interior of the outer vessel;

opening the valve to flow elevated-pressure fluid through the fluid flow control device and through the purification media;

purifying the elevated-pressure fluid of contaminants contained therein by interaction with the purification media to provide the elevated-pressure high purity fluid; and dispensing the elevated-pressure high purity fluid through the outlet of the outer vessel; wherein a first portion of the elevated-pressure high purity fluid dispensed from the inner vessel is separated from the elevated-pressure high purity fluid dispensed after the first portion.

9. The method of claim 8 wherein the elevated pressure high purity fluid is lowered in pressure as it passes through the fluid flow control device.

10. The method of claim 8 wherein the elevated-pressure high purity fluid flows through a second fluid flow control device downstream of the purification media.

11. The method of claim 8 wherein the elevated-pressure high purity fluid is selected from the group consisting of: carbon monoxide, nitric oxide, silane, arsine, diborane, phosphine, dichlorosilane, trichlorosilane and mixtures thereof.

12. The method of claim 8 wherein the purification media is selected from the group consisting of: zeolites, carbons, aluminas, aluminosililcates, silica gels, magnesias, fluorisil, cross-linked microporous polymers, magnesium sulfate, lithium on carbon, barium on carbon, copper on alumina, magnesium chloride on carbon, magnesium chloride on alumina, magnesium bromide on carbon, nickel on alumina, palladium on carbon, porous polypropylene, porous poly (tetrafluorethylene), stainless steel mesh, sintered nickel, sintered stainless steel, porous alumina and mixtures thereof.

13. A method of dispensing an elevated-pressure high purity fluid comprising:

providing an outer vessel having an outlet, an outlet valve, and an interior containing an elevated-pressure fluid;

providing an inner vessel disposed within the outer vessel, wherein the inner vessel contains purification media, has an inlet, and has an outlet connected to the outlet of the outer vessel, and wherein the inlet of the inner vessel has a fluid flow control device adapted to allow fluid to flow from the interior of the outer vessel to the inner vessel and to prevent the flow of fluid from the inner vessel to the interior of the outer vessel;

opening the outlet valve to flow elevated-pressure fluid through the fluid flow control device and through the purification media;

removing contaminants from the elevated-pressure fluid by interaction with the purification media to yield the elevated-pressure high purity fluid;

dispensing the elevated-pressure high purity fluid through the outlet of the outer vessel to an end-use process;

terminating the flow of elevated-pressure fluid through the fluid flow control device and through the purification media;

re-starting the flow of elevated-pressure fluid through the fluid flow control device and through the purification media, and withdrawing an intermediate fluid from the outlet of the outer vessel;

venting an amount of the intermediate fluid withdrawn from the outlet of the outer vessel to a waste handling system; and re-starting the dispensing of the elevated-pressure high purity fluid through the outlet of the outer vessel to the end-use process.

14. A method of shipping, storing, and dispensing an elevated-pressure high purity fluid comprising:

providing an outer vessel having an outlet, an outlet valve, and an interior containing an elevated-pressure fluid;

providing an inner vessel disposed within the outer vessel, wherein the inner vessel contains purification media, has an inlet, and has an outlet connected to the outlet of the outer vessel, and wherein the inlet of the inner vessel has a fluid flow control device adapted to allow fluid to flow from the interior of the outer vessel to the inner vessel and to prevent the flow of fluid from the inner vessel to the interior of the outer vessel;

pressurizing the inner vessel with a pressurizing fluid that is different from the elevated-pressure fluid contained in the interior of the outer vessel;

shipping and/or storing the inner vessel and the contents therein;

opening the outlet valve and releasing the pressure of the pressurizing fluid;

flowing the elevated-pressure fluid through the fluid flow control device and through the purification media;

removing contaminants from the elevated-pressure fluid by interaction with the purification media to yield the elevated-pressure high purity fluid; and dispensing the elevated-pressure high purity fluid through the outlet of the outer vessel to an end-use process.

15. The method of claim 14 wherein the pressurizing fluid is vented to a waste system.

16. The method of claim 14 wherein the elevated-pressure high purity fluid is selected from the group consisting of: carbon monoxide, nitric oxide, silane, arsine, diborane, phosphine, dichlorosilane, trichlorosilane and mixtures thereof.

17. The method of claim 14 wherein the pressurizing fluid is selected from the group consisting of helium, argon, tetrafluoromethane, and nitrogen.

* * * * *

UNITED STATES PATENT AND TRADEMARK OFFICE
CERTIFICATE OF CORRECTION

| | |
|---|---|
| PATENT NO. | : 7,160,359 B2 |
| APPLICATION NO. | : 10/884824 |
| DATED | : January 9, 2007 |
| INVENTOR(S) | : Jean L. Vincent et al. |

It is certified that error appears in the above-identified patent and that said Letters Patent is hereby corrected as shown below:

Column 8, Line 32

In claim 11 delete "dichiorosilane" and insert -- dichlorosilane --

Column 10, Line 17

In claim 16 delete "trichiorosilane" and insert -- trichlorosilane --

Signed and Sealed this

Thirteenth Day of March, 2007

JON W. DUDAS
*Director of the United States Patent and Trademark Office*